United States Patent

[11] 3,593,541

| | | |
|---|---|---|
| [72] | Inventor | Masao Kuroda<br>Mie-ken, Japan |
| [21] | Appl. No. | 815,059 |
| [22] | Filed | Apr. 10, 1969 |
| [45] | Patented | July 20, 1971 |
| [73] | Assignee | Toyo Bearing Manufacturing Company Limited<br>Osaka-shi, Japan |
| [32] | Priority | Apr. 23, 1968, Dec. 9, 1968 |
| [33] | | Japan |
| [31] | | 43/27,256 and 43/90,041 |

[54] CONSTANT VELOCITY UNIVERSAL JOINT
7 Claims, 12 Drawing Figs.

[52] U.S. Cl. ................................................. 64/21
[51] Int. Cl. ................................................ F16d 3/30
[50] Field of Search ................................... 64/21

[56] References Cited
UNITED STATES PATENTS
2,574,226 11/1951 Sampson ...................... 64/21
2,755,641 7/1956 Dunn ............................ 64/21

*Primary Examiner*—Benjamin W. Wyche
*Assistant Examiner*—Randall Heald
*Attorneys*—Hall and Houghton and J. Y. Houghton ABSTRACT: An improved essentially constant speed universal joint comprises two shafts with interfitted ends, each carrying a frustospherical boss provided with stud shafts. The spherical portions of the bosses are mounted in spherically surfaced recesses in adjacent wall elements. The stud shafts are provided with wheels, preferably crowned, which roll on tracks carried by the wall elements, preferably grooves concentric with the spherical recesses therein, in which the crowned wheels are centered. The shaft ends are interfitted by male and female elements fixed to the respective shafts, which provide a simple, strong and lubrication-promoting structure. Securing means, confined to a region radially outwardly of the tracks, wheels an stud shafts, and preferably in the form of a sleeve, or of elements integral with the wall elements, secures the assembly in a simple, permanently effective manner.

MASAO KURODA,
INVENTOR

BY

ATTORNEY

CONSTANT VELOCITY UNIVERSAL JOINT

BACKGROUND OF THE INVENTION

1. Field of the Invention

The present invention relates to a double-branch-shaft-type universal joint similar in power transmission system to the double Cardan joint.

2. Description of the Prior Art

The most general form of constant velocity universal joint is the double Cardan joint. Joints which are similar in power transmission mechanism to the double Cardan joint include double first and second shafts specially interfitted at their adjacent ends, drive means of cooperating form carried by the shafts, an intermediate coupling means having wall elements of specially cooperating form, and means bridgingly securing said wall elements together outwardly of the coupling means. The first and second shafts have adjacent ends, one of which is a male end in the form of a convex surface of revolution, and the other of which is a female end in the form of a concave surface of revolution, and such ends are fixedly carried by the shafts, and interengaged in a manner which promotes their lubrication. The drive means carried by each shaft comprises a boss element of frustospherical form having a longitudinal axis with two transverse axes at right angles thereto and to each other and constituting pivot and stud shaft axes, respectively. The boss, along its longitudinal axis, is apertured and splined to the shaft, and along its stud shaft axis has two radially extending stud shafts. The stud shafts carry needle bearings upon which are mounted wheels which are symmetrical about their median planes and preferably crowned. The intermediate coupling means has two opposed mutually spaced wall elements. Each wall element has two concave spherically surfaced recesses therein for socketing the spherical surfaces of the boss elements, and wheel tracks for the wheels carried thereby. The tracks in one preferred embodiment are in the form of transversely arcuate grooves concentric with the spherical recesses, and transversely substantially complementary to, but of somewhat greater radius than, the arcuately crowned wheel surfaces. The tracks, in another preferred embodiment, are in the form of plane surfaces on which the crowned wheels roll, and in this case the stud shafts are provided with means for retaining the wheels thereon. The means bridgingly securing the wall elements together in one preferred embodiment is in the form of a sleeve member, embracing and retaining plates constituting the wall elements; and in another preferred form the bridging means is formed integral with such plates and the boss elements have sufficiently short lengths along their longitudinal axes to enable them to be passed between the wall elements of the so-formed integral body and to then be rotated into engagement in the spherically surfaced recesses in the wall elements prior to the assembly of the shafts therein.

BRIEF DESCRIPTION OF THE DRAWINGS

In the accompanying drawings illustrating preferred embodiments of the invention:

FIGS. 4 through 6 show a modified form of double branch shaft-type constant velocity universal joint constructed according to the invention; in which

DESCRIPTION OF PREFERRED EMBODIMENTS

Figure 1:
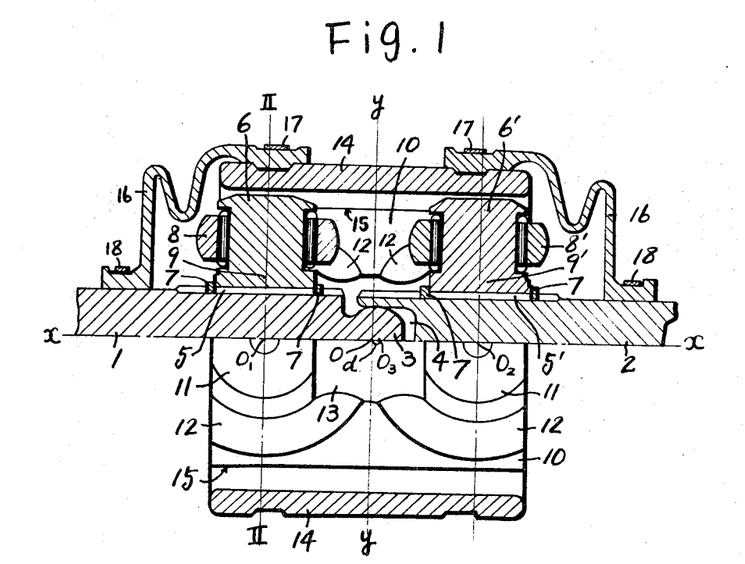
FIG. 1 is a side elevational view in longitudinal section of a double-branch-shaft-type constant velocity joint constructed according to the invention, the lower half of the view being shown with shafts and parts mounted thereon removed.
Figure 2:
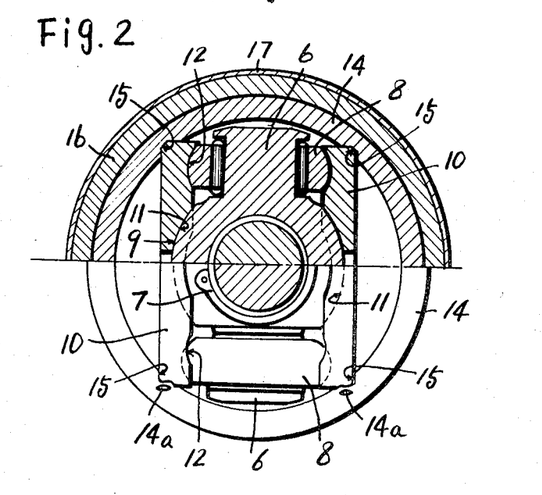
FIG. 2 shows an upper half end view in longitudinal section on line II—II of FIG. 1 and a lower half end view.
Figure 3:
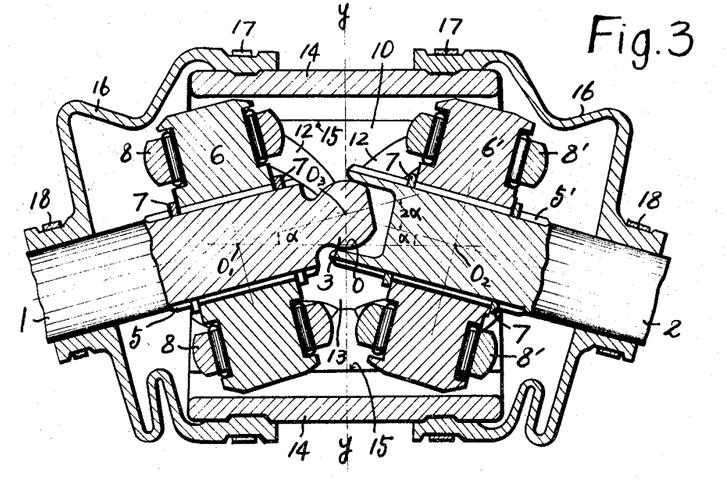
FIG. 3 is a side elevational view taken when the two shafts of the joint have an angle formed therebetween.

In a preferred embodiment of a double-shaft-type constant velocity universal joint shown in FIGS. 1 through 3, the reference numeral 1 denotes a driving shaft; 2, a driven shaft (the relation between these two shafts may be reversed); 3, a spherical body formed integrally at the front end of the driving shaft; and 4, a bore formed in the front end of the driven shaft, 3 and 4 being engaged in a mutually fitted condition. The numerals 5, 5' denote splines formed in the vicinity of the front ends of the shafts 1 and 2; 6, 6', branch shafts fitted on said splined portions; 7, a spring for securing the branch shaft in position; and 8, 8' denote wheel bodies fitted on the neck portions of the branch shafts 6, 6', which wheel bodies cooperate with the branch shaft neck portions and needle rollers to form needle roller bearings. The numeral 9 denotes a portion at which the branch shaft is fitted on the driving or driven shaft, i.e. a boss portion (FIG. 2), whose outer surface portion is shaped spherical The numerals 10, 10' denote plate members grasping the wheel bodies 8, 8' and boss portions 9, 9', the inner surfaces thereof being formed with arcuate track grooves 12 and concave spherical surfaces 11 for respectively receiving said wheel bodies 8, 8' and boss portions 9, 9'. The numeral 13 denotes a clearance provided in order that when the joint makes a large angle, the plate member may not get into contact with the driven shaft end. The numeral 14 denotes a sleeve member, whose inner surface is provided with grooves 15 extending axially thereof for mounting the plate members 10, 10'.

The reference characters $0_1$ and $0_2$ denote the intersections between the respective centerlines of the branch shafts and the shaft centerline, the distance between $0_1$ and $0_2$ being constant. The character 0 denotes the intersection between the centerline $y-y$ of the sleeve member 14 and the centerlines of the shafts 1 and 2 when the latter are on a straight line; in other words, it is the middle point of $0_1-0_2$. The character $0_3$ denotes the center of the spherical body 3, the distance $d$ between 0 and $0_3$ being later described.

The assembling of the joint involves fitting the needle rollers and wheel bodies on the individual branch shafts, fitting said branch shafts on the splines of the shaft ends of the driving and driven shafts, securing said branch shafts in position by snap rings, grasping said branch shafts by the pair of plate members 10, 10 with the shaft ends of the driving and driven shafts fitted together, inserting the subassembly in the grooves from one end of the sleeve member 14, and caulking the end surface of the sleeve member 14 as shown at 14a thereby securing the plate members and sleeve member in position. After grease is suitably filled in, boots 16 are applied and bands 17 and 18 are tightened to complete the assembling.

A brief description of the transmission of power and the motion of each part in this joint will now be given. Power is transmitted from the driving shaft in sequence of branch shaft 6 → intermediate members 10, 14 →, branch shaft 6' → driven shaft 2. When the two shafts are rotating while forming an angle therebetween, the boss positions 9, 9' of the branch shafts and the concave spherical surfaces 11, 11 of the plate members slide relative to each other and during one complete revolution of the joint the wheel bodies make one complete reciprocative rolling motion in the track grooves 12 in the inner surfaces of plate members, attended by the swing motion of the needle roller bearings. Since the motion of the power-transmitting parts is of the rolling type, the friction is low.

In addition, in a plane including the centerline of the branch shaft and perpendicular to the plate member 10, the radius of curvature of the arcuate track grooves 12 is made slightly larger than that of the wheel bodies 8, 8', whereby the wheel bodies 8, 8' roll in the track groove 12 always in a portions condition and the load on the needle roller bearing is uniformly distributed in the direction of the length of the needles.

FIGS. 4 through 8 show another embodiment of the present joint which is the same in power transmission mechanism as the constant velocity universal joint shown in FIGS. 1 through 3, but differs in the following respects. Thus, it has as an intermediate member a sleeve 20 which is equivalent to an integrated assembly of the sleeve member 14 and plate members 10 shown in FIG. 1 through 3, and the opposed inner surfaces 21 thereof are made flat. Further, the outer peripheries of the wheel bodies 22, 22' are made substantially cylindrical, said wheel bodies being smoothly rotatably mounted on branch shafts 23, 23' with their position in the direction of the centerlines of the branch shafts restrained, said wheel bodies being adapted to reciprocatively roll on the plane track surfaces 21 of the sleeve member 20.

Figure 4:
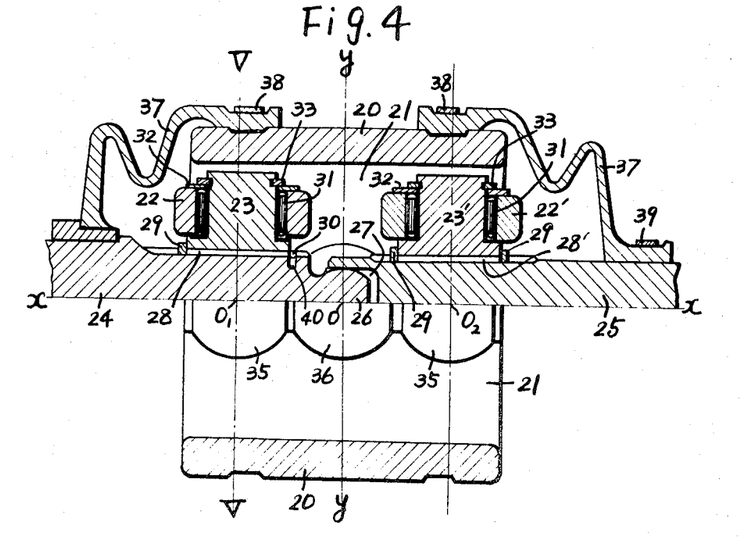
FIG. 4 is a side elevational view in longitudinal section of the universal joint, the lower half of the view being shown with shafts and parts mounted thereon removed.
Figure 5:
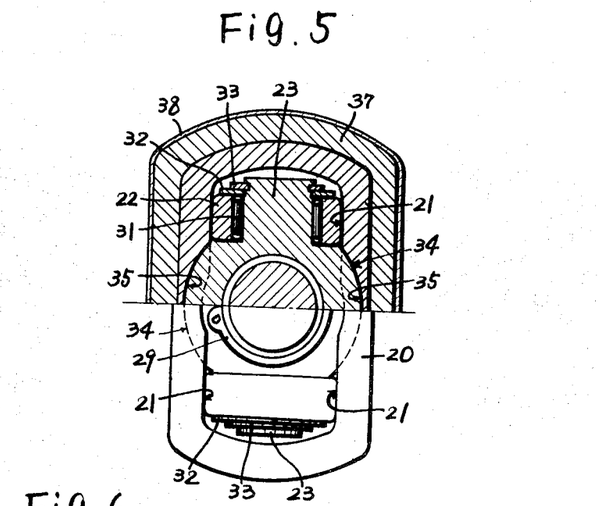
FIG. 5 shows an upper half end view in longitudinal section on line V—V of FIG. 4 and a lower half end view with boots removed.
Figure 6:
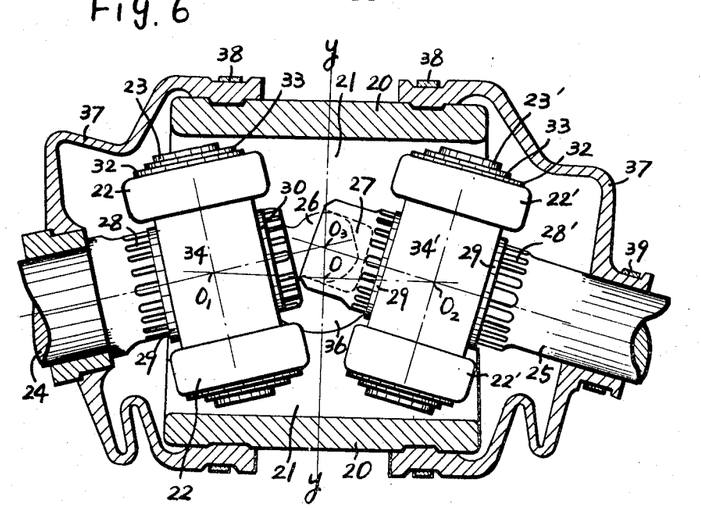
FIG. 6 is a side elevational view in longitudinal section taken when the two shafts of the joint have an angle formed therebetween.

The components and function of this joint will now be described.

In FIGS. 4 through 6, the numeral 24 denotes a driving shaft; 25, a driven shaft; 26, a spherical body formed integral with the driving shaft at the front end thereof; and 27, a bore formed in the front end of the driven shaft, 26 and 27 being engaged in mutually fitted condition. The numerals 28, 28' denote splines formed around the outer peripheries of the shafts 24 and 25 adjacent the front end portions thereof, on which splines the branch shafts 23, 23' are fitted. The wheel bodies 22, 22' fitted on the neck portions of the branch shaft 23, 23' cooperate with the branch shaft neck portions and needle rollers 31 to form needle roller bearings. The numeral 32 denotes a circular plate fitted on the branch shaft and 33 denotes a stop ring, these restraining the corresponding wheel body on the branch shaft. The numerals 34, 34' denote the portions of the branch shafts at which the branch shafts are fitted on the driving and driven shafts, namely, the boss portions (FIGS. 5 and 6), each having its opposed sides made spherical and its portions perpendicular thereto made flat. The sleeve member 20 has two opposed planes 21 on the inner surface thereof and at two places of the respective opposed sides there are formed concave spherical surfaces 35, (FIGS. 4 and 5) and a clearance 36 is provided so that when the joint makes an angle the sleeve member may not get into contact with the driven shaft. The numerals 37, 37' denote boots for holding lubricant grease inside the joint and preventing the entry of foreign matter, and 38, 39 denote bands for clamping the boots against the sleeve member and shafts.

To make a remark about the assembling of this joint, after the needle rollers 31 and wheel bodies 22, 22' are fitted on the respective branch shafts, the circular plates 32 and stop rings 33 are fitted. The thus-assembled branch shafts are then inserted into the sleevelike intermediate member 20 in such a direction that the flat end surface of the boss portion coincides with the axial direction of said sleeve member 20, and at a position where centers of the concave spherical surfaces 35 on the inner peripheral surface of the sleeve member coincide with the branch shaft centers, the branch shafts are turned to assume the condition shown in FIG. 4. Then, the branch shafts are fitted on the splines of the shafts 24 and 25 and fixed in position by the stop rings. The shaft 24 is inserted in such a condition that the stop ring 30 of circular cross section is contracted in the groove 40 of the driving shaft, and when it is inserted until a predetermined position is reached, the stop ring 30 is elastically expanded to secure the branch shaft in position.

The outer periphery of each wheel body 22, 22' is crowned; that is, it is formed as a surface of revolution of arc whose central portion is made slightly convex, so that the load on the needle roller bearing may be uniformly distributed in the direction of the length of the rollers.

The transmission of power and the motion of the parts in this joint are substantially the same as those described with reference to the joint shown in FIGS. 1 through 3.

The nature of constant velocity of the joint of the present invention will now be investigated.

In a joint for transmitting power between two shafts whose centerlines cross each other, the constant velocity universal joint in which the angular velocities of the driving and driven shafts are maintained always equal to each other has it as the necessary and sufficient condition of constant velocity transmission that even if the angle formed between the two shafts is varied, the intermediate member means interconnecting the two shafts for transmission of power be maintained in a constant relative position with respect to a plane bisecting said angle.

Therefore, in the joint of the invention, taking as an example the joint shown in FIGS. 1 through 3, the condition of constant velocity is that the sleeve member 14 and plate members 10, 11 which are the intermediate members be always in an equal relative position with respect to the two shafts irrespective of the degree of the angle formed between the two shafts. The necessary and sufficient condition is that the axis of symmetry y—y in FIG. 1 is always on a plane bisecting the angle formed between the two shafts. A mechanism which meets this condition is as follows.

Suppose that, as shown in FIG. 3 the two shafts form an angle of $2\alpha$ and the sleeve member and the two shafts respectively form angles of $\alpha$ with each other and that power is transmitted from the driving shaft 1 to the driven shaft 2.

Let the angular velocities of the driving shaft 1 and sleeve member 14 be $W_1$ and $W_0$, respectively, and their torques be $T_1$ and $T_0$, and the rotative angles of the driving shaft 1 and sleeve member 14 as measured with the position shown in FIG. 3 taken as their respective references be $\theta_1$ and $\theta_0$, respectively. Then, as in the case of the Cardan joint, the relation between the two is given by the following formulas:

$$\tan \theta_0 = \frac{\tan \theta_1}{\cos \alpha} \quad (1)$$

$$W_0 = \frac{\cos \alpha}{1-\sin^2 \alpha \cos^2 \theta_1}\omega_1 \quad (2)$$

When $\theta_1 = \theta_0 = 0$, then $$\omega_0 = \frac{W_1}{\cos \alpha}$$

$$T_0 = T_1 \cos \alpha$$

Further, when $\theta_1 = \theta_0 = 90°$, then $$\omega_1 = \omega_0 \cos \alpha$$

$$T_0 = \frac{T_1}{\cos \alpha}$$

For rotative angles other than integral multiples of 90°, $\theta_1 \neq \theta_0$, and the angular velocity and torque take values intermediate between above-mentioned values and repeat periodical variations twice in one complete revolution of the joint. However, in the transmission of power from the sleeve member 14 to the driven shaft 2, since the angular velocity and torque are always in reverse relation to the variation in the case of transmission from the driving shaft 1 to the sleeve member 14, the angular velocities and torques of the driving shaft 1 and driven shaft 2 are always equal, thus meeting the condition of the so-called constant velocity joint. These relations are entirely the same as in the case of the double-Cardan-type constant velocity universal joint. Thus, the principles of transmission of power are the same as the double-Cardan-type constant velocity universal joint, but in the aspect of mechanism the Cardan joint uses cruciform shafts and the needle roller bearings at the front ends of the shafts have their outer races fixed to the inside of the yoke so that they swing only in the needle roller bearings, whereas the joint of the present invention differs therefrom in that the outer races of the needle roller bearings on the two arms of each branch shaft are rolled as the wheel bodies 8, 8' in the arcuate track grooves, the employment of such mechanism resulting in various advantages to be described later. When the joint makes the first half revolution from the position shown in FIG. 3, the wheel bodies are rolled in the grooves in the plate members through an angle of $2\alpha$ around an axis perpendicular to the plate member and passing $0_1$ or $0_2$, and when the joint makes the latter half revolution, the wheel bodies are returned to their original position. That is to say, the wheel bodies, too, make one complete reciprocative rolling motion for each revolution of the joint.

As described previously, to meet the condition of the constant velocity joint, it is essential that irrespective of the degree of the angle formed between the two shafts, the plane of symmetry y-y coincides with a plane bisecting said angle. The driving shaft 1 and the sleeve member 14 are tilted around $0_1$, and the driven shaft 2 and the sleeve member 14 are tilted around $0_2$, but since $0_1$ and $0_2$ are in constant positions with respect to the sleeve member 14, the above-mentioned condition can be met if $0_1$ and $0_2$ are equally spaced from y-y and the two shafts, when forming any angle, are in the same plane and the angles which the centerlines of the two shafts form with the straight line $0_1$ and $0_2$ are always equal.

Figure 7:
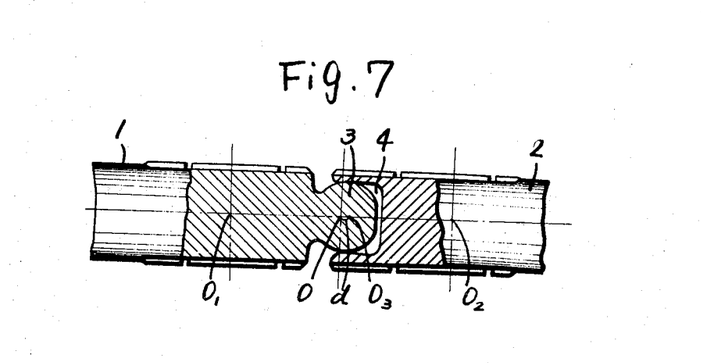
FIG. 7 is a side elevational view in longitudinal section of the two shafts of the joint alone taken when said shafts are on a straight line.
Figure 8:
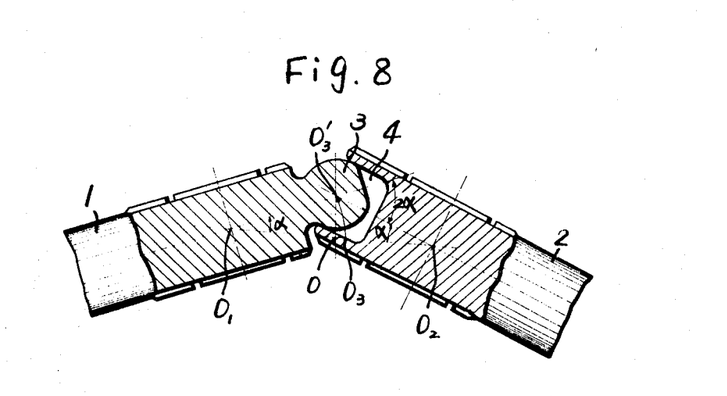
FIG. 8 is a side elevational view in longitudinal section of the shafts alone taken when the shafts have an angle formed therebetween.

This condition can be substantially met if the shaft ends are shaped as shown in FIGS. 1 and 3, FIGS. 7 and 8 show side elevational view in longitudinal section of the shafts alone; FIG. 7 shows a side elevational view in longitudinal section taken when the two shafts are on a straight line and FIG. 8 shows a side elevational view in longitudinal section taken on a plane including the centerlines of the two shafts when the two shafts form an angle. The shaft end of the driving shaft 1 is formed as a spherical body 3 with $0_3$ as the center and the shaft end of the driven shaft 2 is provided with a cylindrical bore adapted to establish a slide fit therewith. The connection between the spherical body 3 and the driving shaft 1 is so shaped as to avoid any interference even when the two shafts make the maximum angle.

In FIG. 7, 0 is the middle point of $0_1$ $0_2$ and is located on the plane of symmetry y-y, but the center $0_3$ of the spherical body is slightly deviated from 0 toward $o_2$. Even when the driving shaft 1 is tilted, the distance from the center $0_3$ of the spherical body to $0_1$ is always constant, but the distance on the centerline of the driven shaft 2 between $0_2$ and the point of contact between the spherical body and the cylindrical bore is gradually increased as the angle is increased. When the two shafts make an angle of $2\alpha$ as shown in FIG. 8 and the center of the spherical body is located on a plane perpendicular to the straight line $0_1$ $0_2$ and passing through $0_3$, such point being termed $0_3'$, the angles $0_3'$ $0_1$ $0_2$ and $0_3'$ $0_2$ $0_1$ are equal, thus completely meeting the condition of constant velocity, and further in case the two shafts lie on a straight line as shown in FIG. 7, constant velocity is of course achieved, but when the two shafts make angles other than that, the condition of constant velocity is not met in a strict sense. Next, the extent of nonconstant velocity when optional angles are formed will be investigated.

Figure 9:
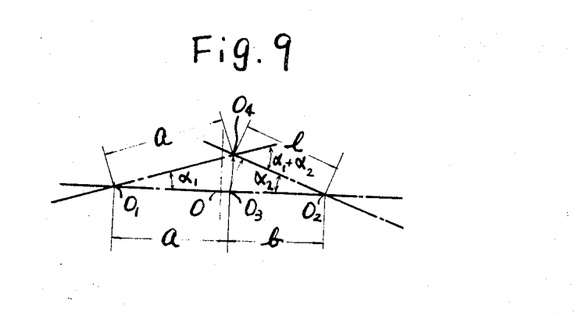
FIG. 9 is a diagram for the calculation of variations in the angular velocity of the joint shown in FIG. 1.

In FIG. 9, let $0_1$ $0_4=0_1$ $0_3=a$ (constant), $0_2$ $0_4=1$, $0_3$ $0_2=b$, and the angles between the driving shaft 1, driven shaft 2 and $0_1$ $0_2$ be $\alpha_1$ and $\alpha_2$, respectively, then the following relations hold.

$$a \cos \alpha_1 + l \cos \alpha_2 = a+b \quad (3)$$

Therefrom,
$$a \sin \alpha_1 = l \sin \alpha_2 \quad (4)$$

$$\cos^2 \alpha_2 = \frac{(K-\cos \alpha_1)^2}{1+K^2-2K \cos \alpha}$$

where $$K=1+\frac{b}{a}$$

$$\cos \alpha_2 = \frac{K - \cos \alpha_1}{\sqrt{1+K^2 - 2K \cos \alpha_1}} \quad (5)$$

Next, the rotative angles of the two shafts 1, 2 and the sleeve member 14 as measured from their reference positions be $\theta_1$, $\theta_2$ and $\theta_0$, respectively, and a longitudinal section such as one sown in FIGS. 3 and 8 be reference position, when $\theta_1=\theta_2=0$, then by relations similar to those of cardan joint, $$\tan \theta_1 = \cos \alpha_1 \cdot \tan \theta_0$$

$$\tan \theta_2 = \cos \alpha_2 \cdot \tan \theta_0$$

$$= \frac{\cos \alpha_2}{\cos \alpha_1} \cdot \tan \theta_1 \quad (6)$$

Let the angular velocities of the two shafts 1 and 2 and the sleeve member 14 be $W_1$, $W_2$ and $W_0$, respectively, and by differentiation with respect to time, we obtain $$\frac{\omega_2}{\omega_1} = \frac{d\theta_2/dt}{d\theta_1/dt} = \frac{K'}{\cos^2 \theta_1 + (K' \sin \theta_1)^2} \quad (7)$$

where $$K' = \frac{\cos \alpha_2}{\cos \alpha_1}$$

When $K'=1$, it follows from the formula 7 that $\omega_2=\omega_1$, but this is a matter of course since if $K'=1$, then $\alpha_1=\alpha_2$.

From the formula 7, if
$$\frac{d}{d\theta_1} \cdot \frac{\omega_2}{\omega_1} = 0$$

then
$$K'(K'^2-1) \sin 2\theta_1 = 0$$

When
$$K' \neq 0, = \frac{d}{d\theta_1}\left(\frac{\omega_2}{\omega_1}\right) = 0 \text{ at } \theta_1 = \frac{\pi}{2}n (n=0, 1, 2, 3, \ldots)$$

3.....), so that $\frac{\omega_2}{\omega_1}$ possesses extreme values. As for the values, from the formula (7), $$\left. \begin{array}{l} \text{when } n=0, 2, 4 \ldots, \frac{\omega'_2}{\omega_1} = K' \\ \text{when } n=1, 3, 5 \ldots, \frac{\omega_2}{\omega_1} = \frac{1}{K'} \end{array} \right\} \quad (8)$$

As the angle formed between the two shafts is $\alpha_1+\alpha_2$ if $\alpha_1=\alpha$ $_2=\alpha$ when said angle has a particular value, then at that angle $a=l$;

therefore, by setting $$a = \frac{a+b}{2 \cos \alpha} = \frac{0_1 0_2}{2 \cos \alpha}$$

the position of $0_3$, namely the distance d from 0 can be evaluated. Although $\alpha_1 \neq \alpha_2$ for other angles, $\alpha_2$ can be evaluated for any value of $\alpha_1$ from the formula (5). Further, extreme values of $\omega_2/\omega_1$ can be evaluated from the formula (8).

When the angular velocity $\omega_1$ of the driving shaft 1 is constant, the rate of variation in the angular velocity of the driven shaft can be expressed by $|\omega_2 - \omega_1|$ $$\frac{}{\omega_1}$$

but the maximum value thereof can be evaluated from the formula (8). thus, when $\alpha_1 < \alpha_2$, $K'-1$ is the maximum value of the rate of variation in the angular velocity and when $\alpha_1 < \alpha_2$, $\frac{1-K'}{K}$ is the maximum value.

Figure 10:
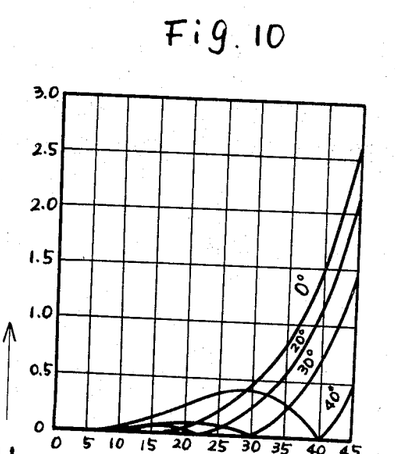
FIG. 10 is a characteristic diagram showing variations in the angular velocity of the universal joint shown in FIG. 1.

FIG. 10 is a diagram showing the maximum value of the rate of angular velocity variation $$\frac{|\omega_2 - \omega_1|}{\omega_1}$$

when the center $O_3$ of the spherical body 3 is set so that when the working angle formed between the two shafts is 0°, 20°, 30°, and 40°, $\alpha_1=\alpha_2$. For example, if the position of $O_3$ is determined so that constant velocity is achieved when the angle formed between the two shafts is 20°, then the maximum value of the rate of angular velocity variation is 0.05 percent or less within the range of 0~22°for the working angle of the joint, as shown in the FIG., which may practically be said to be constant velocity. This is extremely small as compared with the fact that the maximum value of the rate of angular velocity variation when one Cardan joint is used is about 6.5 percent at a working angle of 20°. The present joint is capable of optionally determining the position of $O_3$, namely the length of $d$, in accordance with the range of the angle used.

The above-mentioned nature of constant velocity also applies to the joint shown in FIGS. 4 through 6.

Figure 11:
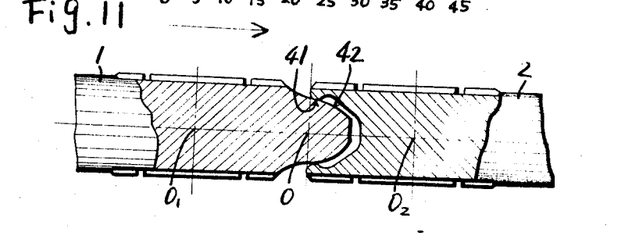
FIGS. 11 and 12 are side elevational views in longitudinal section similar to FIGS. 7 and 8 but showing a modified form of shaft end shape.
Figure 12:
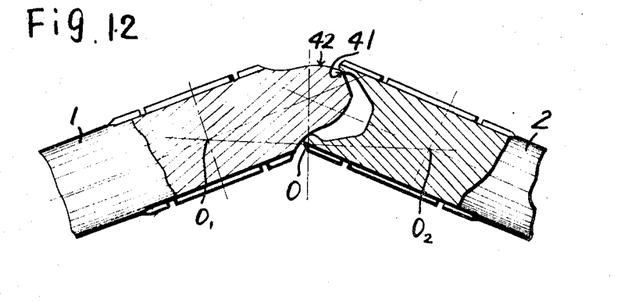

FIGS. 11 and 12 are views showing how the shaft ends are engaged with each other in a different arrangement. FIG. 11 is a side elevational view in longitudinal section taken when the centerlines of the two shafts are on a straight line. FIG. 12 is a side elevational view in longitudinal section taken on a plane including the centerlines of the two shafts when the two shafts form an angle. The entrance portion of the shaft end bore in the driven shaft 2 is an annular surface formed by revolving an arc 41 around the centerline of the shaft and the shaft end of the driving shaft 1, in FIG. 11, is a surface of revolution formed by revolving an approximate cycloidal curve 42 contacting said arc around the centerline of the shaft. In a plane including the centerlines of the two shafts, the shaft ends of the two shafts have a shape corresponding to a part of a pin gear. Such approximate cycloidal curve is obtained by drawing a base circle having a radius of $O_1O_2/2$ with $O_1$ as the center, drawing a number of small circles having the radius of arc 17 on an epicycloidal curve formed by a rolling circle having the same radius as the base circle, and drawing the envelope thereof.

Even if the two shafts are inclined as shown in FIG. 12, the employment of such engaging arrangement makes it possible that the two surfaces of revolution contact each other at two points in a plane including the centerline of the two shafts and the angles which the centerlines of the two shafts form with $O_1$, $O_2$ are always equal thus meeting the condition of constant velocity. When the two shafts form an angle, however, though the surfaces of revolution of the two shaft ends contact each other at two points in the section shown in FIG. 12, in other areas a slight clearance is formed between the two surfaces of revolution. With this mechanism, where there is a slight clearance between the two shaft ends, the relative motion between the two shaft ends in a direction at a right angle to the section shown in FIG. 12 tends to become large as compared with the engaging mechanism shown in FIG. 7. Further, the slip at the contact portions, too, is larger in this engaging mechanism.

Although the two types of shaft end engaging mechanism described above have their respective merits and demerits, they can be made practically well fit for use by hardening the contact portions of the two shafts ends as by high frequency hardening to provide a wear-resisting property and using a suitable lubricant.

Finally, features of the double-branch-shaft-type constant velocity joint according to the present invention will be described.

Structural feature will first be described. This resides in an arrangement comprising branch shafts respectively secured to two power-transmitting shafts adjacent the shaft ends thereof, the opposed sides of the boss portion of each branch shaft being made spherical, intermediate members means for transmission of power having its inner surface formed with two pairs of concave spherical surfaces grasping the respective boss portions of the branch shafts in slide fit relation, wheel bodies forming the outer races of needle roller bearings at the neck portions of the branch shafts, the outer peripheral surface of each wheel body being a surface of revolution formed by revolving an arc so that the wheel bodies roll in arcuate track grooves formed in the intermediate members, or alternatively, the outer peripheral surface of each wheel body being a slightly crowned cylindrical surface so that the wheel bodies roll on the plane track on the inner surface of the intermediate member means, the shaft ends of the two shafts being formed as a spherical body and a cylindrical bore which are fitted and joined together, or alternatively, said shaft ends being convex and concave surfaces of revolution of special shape and being fitted and joined together, whereby the intermediate members means is always maintained in a constant relative position with respect to a plane bisecting the angle formed between the two shafts.

Regarding the feature in the aspect of the mechanism, the load is always caused to act on central portion of the width of each wheel body and to be uniformly distributed over the needle rollers either by slightly differentiating the respective radii of curvature of the track groove and wheel body whose outer peripheral surface is a surface of revolution from each other, or by slightly crowning the cylindrical outer peripheral surface of the wheel body rolling on the plane track. With such provision, e.g., in the form of FIGS. 1—3 wherein the wheels 8, 8' pass freely onto the needle bearings as shown, such convex curvature or crowning of the perimeters of the wheels 8, 8' cooperates with the cooperating contour of the wheel tracks 12 to maintain the wheels centered on their bearings. This effect is obtained because at the regions where the crowned wheels 8, 8' and the track surfaces are drivingly engaged, the convexed or crowned surfaces of the wheels 8, 8' tend to center themselves within the clearances provided or developed with wear, more or less as crowned pulley surfaces tend to center themselves in driving belts. Such action holds the wheels 8, 8' centered on the needle bearings, and maintains the parts of the wheel perimeters proximate to the tracks in the nondriving direction centered with respect to the median planes thereof. Rubbing friction between, and wear of, the wheel perimeters and the track surfaces is thus kept very small. In the Cardan joint wherein the outer races are fitted on a yoke, premature failure often occurs owing to the needle rollers being subjected to loads at their ends caused by machining errors such as misalignment of yoke bores. In contrast, in the present joint, there is no such danger whatever.

Most of the loads by torque in the case of transmitting power act on the needle roller bearings and between the wheel bodies and the arcuate track grooves in the plate members or the inner surface of the sleeve member, but such are each related to a rolling motion and hence the friction is low.

The spherical mating portions of the branch shaft boss portions and of the inner surface of the plate members or sleeve member make a sliding motion and the shaft end engaging portions make a rolling and sliding contact and these portions are acted upon by slight amounts of load due to a second moment as in the case of a Cardan joint, but the total frictional loss is small as compared with other types of constant velocity joints and the durability is also superior. When a thrust load acts on the shafts, it is supported by the spherical mating portions of the branch shaft boss portions and of the inner surface of the plate members or sleeve member, so that a substantial amount of thrust load can be withstood. The angle formed between the two shafts can be up to a maximum of 45° and the range of angle is thus wide as compared with other various constant velocity universal joints. Next, the greatest feature is that the parts are relatively simple in shape, suitable for mass production, easy to assemble and can be produced at low cost.

Further, in the Cardan joint, only a small amount of grease present in the needle roller bearing is used for lubrication, whereas the present joint is capable of enclosing a large amount of grease in the interior so that it can withstand prolonged use, a fact which is also a feature of the present invention.

I claim:

1. A substantially constant velocity universal joint comprising, in combination:
   a. a first shaft;
   b. a second shaft;

c. said shafts having adjacent ends one of which is a male end in the form of a convex surface of revolution and the other of which is a female end in the form of a concave surface of revolution, said surfaces of revolution being fixedly carried by said respective shafts and said concave surface of revolution slidingly and tiltably embracing said convex surface of revolution so that the two shafts are fitted together at their said adjacent ends;

d. a pair of drive means carried by said first and second shafts respectively, each of said drive means comprising:
   1. a boss element of frustospherical form having a longitudinal axis with two transverse axes at right angles to its longitudinal axis and to each other, one of said transverse axes being a pivot axis and the other being a stud shaft axis, and each said boss elements having along its longitudinal axis an aperture splined to the respective shaft and having along its stud axis two radially extending stud shafts,
   2. needle bearings carried by each of said stud shafts, and
   3. wheels mounted on said needle bearings respectively, said wheels being symmetrical about their median planes;

e. an intermediate coupling means having two opposed mutually spaced wall elements, said wall elements each having two concave spherically surfaces recesses therein socketing the spherical surfaces of said boss elements and having wheel tracks for said wheels at opposite sides of said recesses; whereby on mounting of said drive means and fitted shafts therein, tilting of said shafts out of axial alignment may be affected about the pivot axes of said bosses, and f. means bridgingly securing said wall elements together and confined to a region radially outwardly of said tracks, wheels and stud shafts.

2. A joint as claimed in claim 1, wherein
e. the perimeters of said wheels are transversely crowned.

3. A joint as claimed in claim 1, wherein
g. the perimeters of said wheels have arcuately crowned surfaces, and
h. said wheel tracks are in the form of arcuate grooves transversely substantially complementary to but of somewhat greater radius than the crowning of said arcuately crowned wheel surfaces.

4. A joint as claimed in claim 1, wherein
g. the perimeters of said wheels are provided with crowned substantially cylindrical surfaces,
h. said wheel tracks are in the form of plane surfaces, and
i. said stud shafts are provided with means for retaining said wheels thereon.

5. A joint as claimed in claim 1, wherein
g. said concave surface of revolution is in the form of a bore having an annular surface at its entrance end formed by revolving an arc about the centerline of the shaft, and
h. said convex surface of revolution has a form generated by revolving about the centerline of the shaft a curve approximately cycloidal with respect thereto and contacting the arc referred to in clause (g).

6. A joint as claimed in claim 1, wherein
g. said wall elements are in the form of a pair of plates, and
h. said securing means (f) is in the form of a sleeve member embracing and retaining said plates.

7. A joint as claimed in claim 1, wherein
g. said bridging means (f) forms an integral body with said coupling means (e), and
h. said boss elements have sufficiently short lengths along their longitudinal axes to enable them to be passed between the said wall elements of said integral body and be then rotated into engagement in the spherically surfaced recesses in said wall elements prior to the assembly of said shafts therein.